(12) United States Patent
Morningstar

(10) Patent No.: US 6,176,047 B1
(45) Date of Patent: Jan. 23, 2001

(54) BIRD DETERRING DEVICE

(76) Inventor: Brendan Morningstar, Box 46, Goodlands, Manitoba (CA), R0M 0R0

( * ) Notice: Under 35 U.S.C. 154(b), the term of this patent shall be extended for 0 days.

(21) Appl. No.: 09/253,428

(22) Filed: Feb. 18, 1999

(30) Foreign Application Priority Data

Feb. 18, 1999 (CA) .................................................. 2263005

(51) Int. Cl.⁷ .................................................. A01K 7/00
(52) U.S. Cl. .................................. 52/101; 40/538; 43/1; 446/153; 446/154; D21/603; D21/584
(58) Field of Search .................. 52/101; 40/538; 43/1; 446/153, 154, 313, 368; D21/603, 584, 598, 600

(56) References Cited

U.S. PATENT DOCUMENTS

| | | | |
|---|---|---|---|
| D. 272,932 | * 3/1984 | Sassak | D21/157 |
| D. 306,692 | * 3/1990 | Ferrero | D9/318 |
| D. 328,242 | * 7/1992 | Chan | D8/388 |
| D. 356,836 | * 3/1995 | Pedersen | D21/157 |
| D. 363,958 | * 11/1995 | Kelly | D21/157 |
| 2,339,983 | * 1/1944 | Day | 43/3 |
| 2,670,569 | * 3/1954 | Heina | 446/153 |
| 3,050,902 | * 8/1962 | Glass et al. | 46/123 |
| 6,027,393 | * 2/2000 | O'Rourke | 446/153 |

* cited by examiner

Primary Examiner—Beth A. Stephan
Assistant Examiner—Phi Dieu Tran A
(74) Attorney, Agent, or Firm—Adrian D. Battison

(57) ABSTRACT

A bird deterring device is provided for deterring birds away from a body of water. The device includes a hollow body shaped to resemble a crocodile floating in a body water. The body includes a plurality of hollow sections having floats mounted therein for floating the device on the body of water. A pair of reflectors are mounted on the body to resemble eyes. A weight tethered to a bottom side of the body anchors the body and prevents it from flipping over in the water.

3 Claims, 2 Drawing Sheets

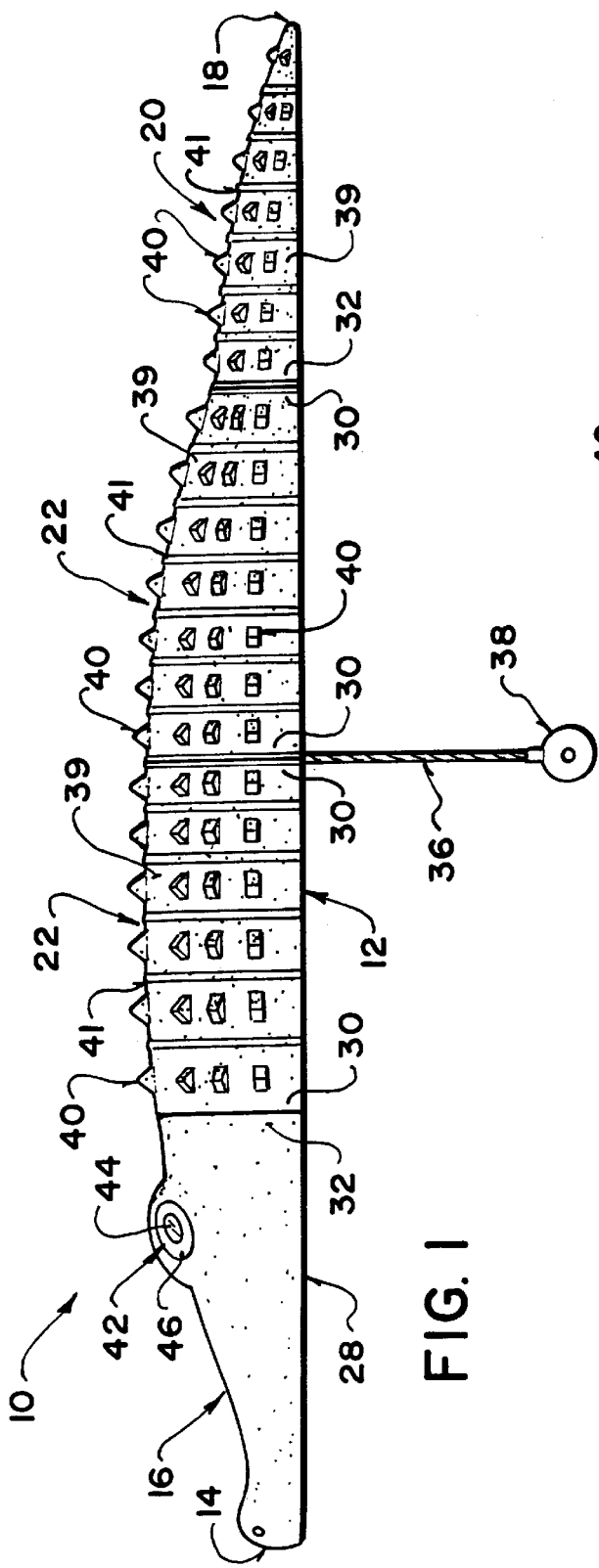
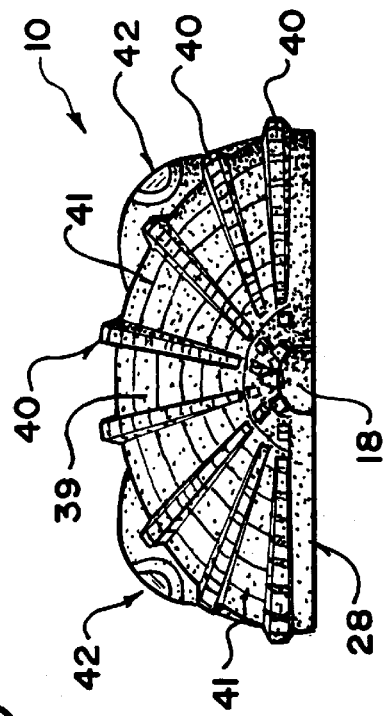
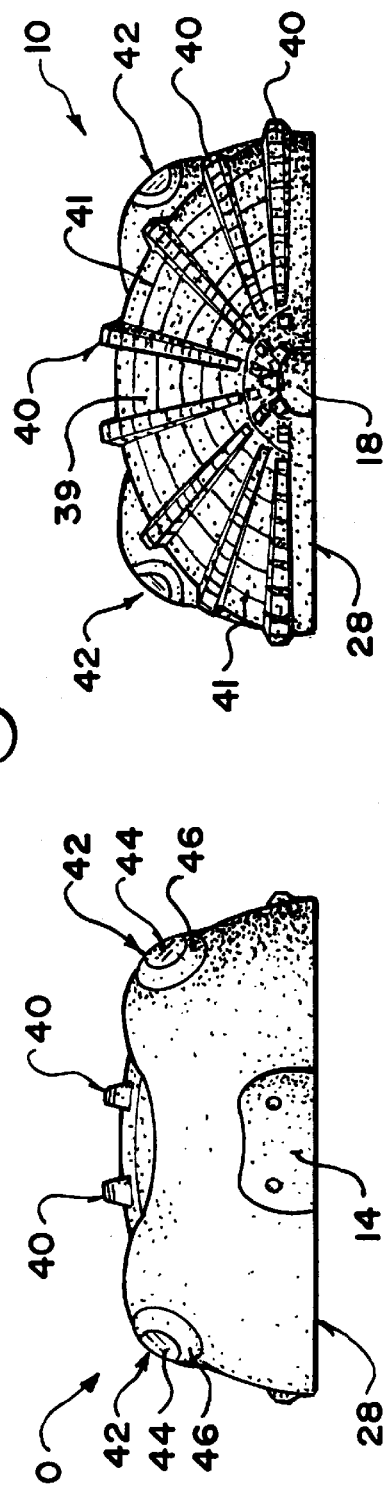

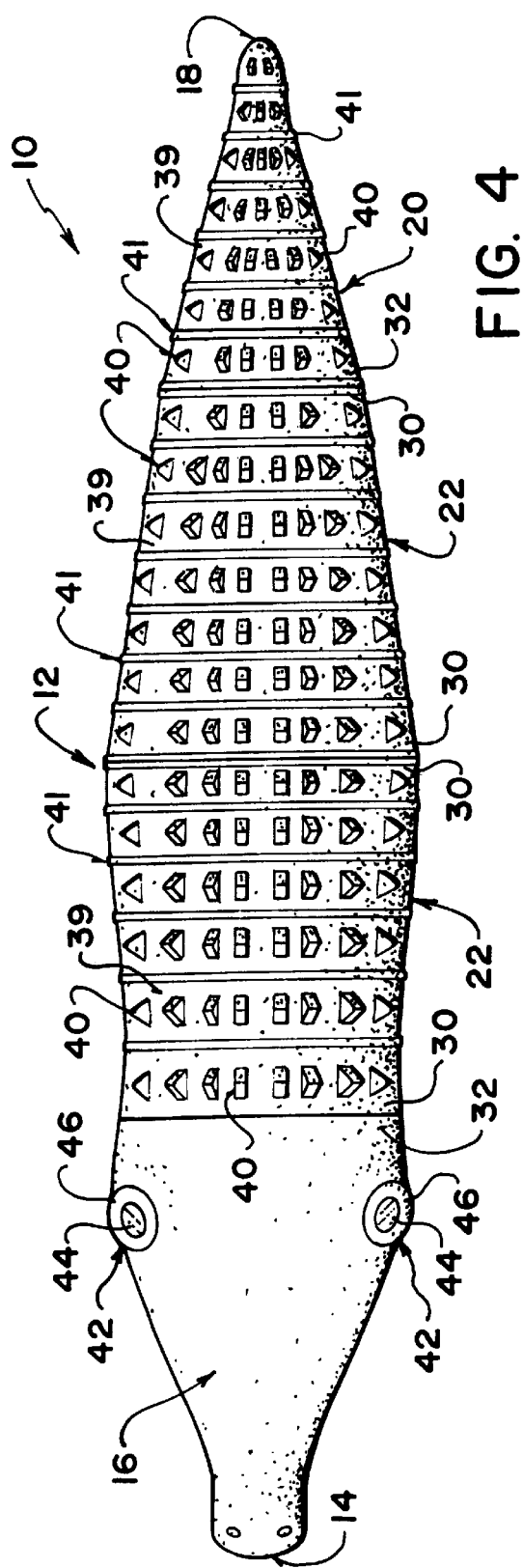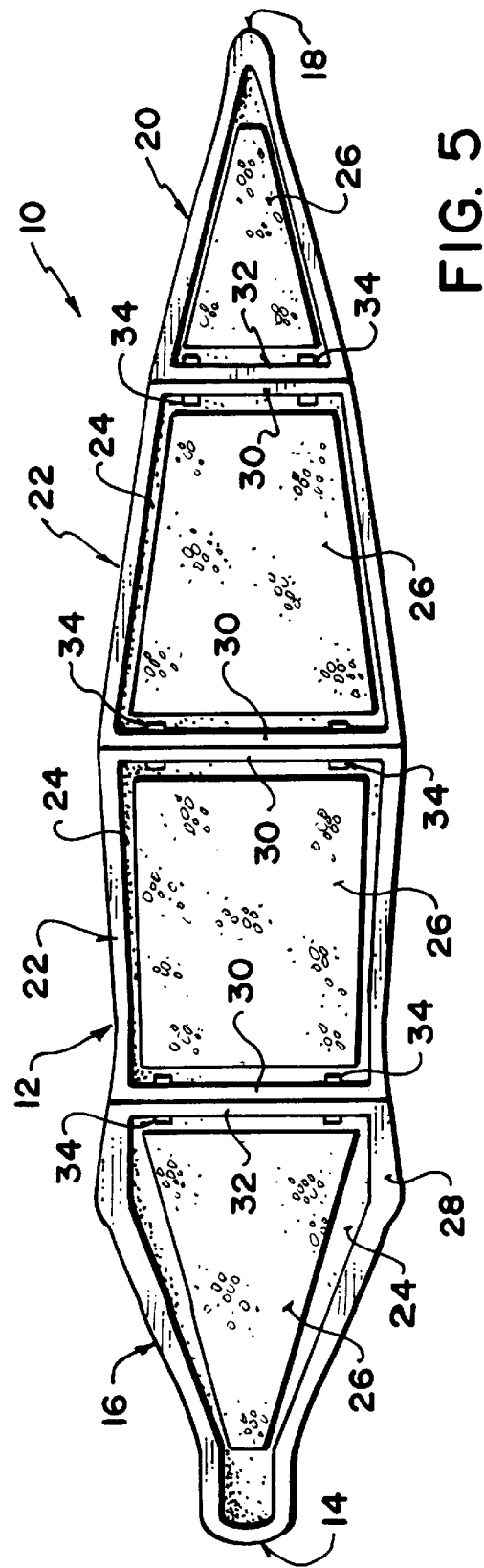

BIRD DETERRING DEVICE

FIELD OF THE INVENTION

This invention relates to a bird deterring device for deterring birds and more particularly to a bird deterring device for deterring birds away from a body of water.

BACKGROUND

Cormorants, herons and other predatory species of birds which prey on fish often flock towards bodies of water such as ponds which hold fish. The birds prey on these fish and deplete the number of fish in the pond. These birds however are known to fear crocodiles and the like which in turn prey on these birds.

SUMMARY

According to the present invention there is provided a bird deterring device for deterring birds away from a body of water, said device comprising:
   a housing arranged to float on the body of water, the housing being shaped like an upper portion of a large amphibious reptile; and
   a pair of reflectors each comprising a reflective centre and a contrasting surrounding area, the reflectors being mounted on the housing to resemble eyes of the animal.

Preferably the centres of the reflectors are coated with a multidirectional reflective material.

The housing preferably comprises a head portion at a front end, a tail portion at a rear end and an arched body section extending therebetween.

The housing is preferably hollow having an inner chamber therein. A plurality of floats may be mounted within the inner chamber.

Anchoring means may be provided for anchoring the housing on the body of water. When using anchoring means, the anchoring means may comprise a weight connected to bottom side of the housing by a tether.

Preferably the housing is substantially greater in width than in height.

The housing may comprise a plurality of sections connected together, the sections being selectively separable from each other such that the device is compactable for transport and storage.

BRIEF DESCRIPTION OF THE DRAWINGS

In the accompanying drawings, which illustrate an exemplary embodiment of the present invention:

FIG. 1 is a side elevational view of the bird scaring device.

FIG. 2 is a front elevational view of the device.

FIG. 3 is a rear elevational view of the device.

FIG. 4 is a top plan view of the device.

FIG. 5 is a bottom plan view of the device.

DETAILED DESCRIPTION

Referring to the accompanying drawings, there is illustrated a bird deterring device generally indicated by the reference numeral 10. The device 10 is intended to float on a body of water for repelling birds away from the water.

The device includes an elongate housing 12 being shaped like a large amphibious reptile such as a crocodile which is floating in the water. A front end 14 includes a head section 16 of the crocodile and a rear end 18 includes a tail section 20 of the crocodile. A pair of body sections 22 are connected between the head and tail sections 16 and 20.

The housing 12 is a plastic shell shaped to resemble only an upper portion of a crocodile's body which extends above a surface of the water when a crocodile is floating or swimming in the water. The housing 12 does not include a lower portion of a crocodile nor does it include any feet.

The profile of the head section 16 extends upward and rearward from the front end 14 which is tapered and curved to resemble the nose of a crocodile. The profile of the body sections 22 are arched first upward and rearward then downward and rearward to resemble a crocodile's back. The tail section 20 is tapered towards the rear end 18 of the housing.

Each section of the housing 16, 20 and 22 is a hollow member defining an inner chamber 24 for housing a float 26 such as a block of styrofoam therein. The inner chamber 24 extends through a bottom face 28 of the housing for inserting the float therethrough. Each section is substantially greater in width than in height for stability such that the section will float level on a surface of the water.

Ends 30 of the body sections 22 and an inner end 32 of both the head and tail sections are each in the form of a flat plate for mounting the sections adjacent to each other. A plurality of fasteners 34 extend through each adjacent pair of plates for connecting the sections together. The fasteners 34 are easily removed and replaced such that the sections are separable and the device may be compacted for transporting or storing the device.

A tether 36 is connected to the bottom face 28 of the housing at a top end for extending downwards into the water. A weight 38 is connected at a bottom end of the tether 36 such that the weight applies a downward force on the tether. The weight 38 acts as an anchor for stabilising the housing and prevents the housing from rolling over in the water in use.

An outer face 39 of the pair of body sections 22 and the tail section 20 include a plurality of protrusions 40 mounted thereon to resemble a crocodile's back. A plurality of ribs 41 are also mounted on the outer face 39 and extend laterally across the tail and body sections 20 and 22 to further resemble a crocodile's back.

A pair of eyes 42 are mounted on the head section 16. Each eye 42 acts as a reflector and includes a centre 44 coated with multidirectional reflective material. A surrounding area 46 of the eye 42 is black such that it contrasts with the centre.

The reflective nature of the eyes in combination with the overall appearance of the housing produces a very life like crocodile which is effective in deterring birds away from a body of water in which the device is located.

While one embodiment of the present invention has been described in the foregoing, it is to be understood that other embodiments are possible within the scope of the invention. The invention is to be considered limited solely by the scope of the appended claims.

What is claimed is:
1. A method comprising:
   deterring birds away from a body of water by:
      providing an elongate body arranged to float on the body of water;
      arranging the shape of the body to simulate an upper portion of a predatory amphibious reptile;
      forming the elongate body in a plurality of separate body sections arranged end to end and each defining a portion of the length of the elongate body, one of the sections at one end of the elongate body forming a head section;

locating the body in a body of water;

causing the separate body sections of the elongate body to float in the body of water with the upper portion of each exposed above the water;

tethering the elongate body within the body of water so as to be maintained in the body of water at a required location;

providing on the head section of the elongate body a pair of reflectors;

locating the reflectors on the head section at locations thereon to simulate eyes of the predatory amphibious reptile;

and forming each reflector with a reflective centre coated with a multi-directional reflective material so as to simulate reflections from the eyes of the predatory amphibious reptile.

2. The method of claim 1 wherein each section of the elongate body is hollow.

3. The method of claim 1 wherein each section of the elongate body contains a flotation material.

\* \* \* \* \*